United States Patent
Thiebaut et al.

(10) Patent No.: US 8,078,166 B2
(45) Date of Patent: Dec. 13, 2011

(54) DEVICE FOR CONTROLLING ACCESS OF SUBSCRIBER TERMINALS OF A CS DOMAIN TO SERVICES OF AN IMS COMMUNICATION NETWORK

(75) Inventors: Laurent Thiebaut, Antony (FR); Alain Bultinck, Longpont sur Orge (FR)

(73) Assignee: Alcatel Lucent, Paris (FR)

( * ) Notice: Subject to any disclaimer, the term of this patent is extended or adjusted under 35 U.S.C. 154(b) by 1001 days.

(21) Appl. No.: 11/816,691

(22) PCT Filed: Feb. 20, 2006

(86) PCT No.: PCT/FR2006/050149
§ 371 (c)(1),
(2), (4) Date: Oct. 18, 2007

(87) PCT Pub. No.: WO2006/090081
PCT Pub. Date: Aug. 31, 2006

(65) Prior Publication Data
US 2008/0160995 A1 Jul. 3, 2008

(30) Foreign Application Priority Data
Feb. 23, 2005 (FR) .................................. 05 50492

(51) Int. Cl.
*H04Q 7/20* (2006.01)
(52) U.S. Cl. .......................... 455/433; 455/560; 455/436
(58) Field of Classification Search .................. 455/433, 455/435.1, 432.1, 432.2, 560, 436; 370/338, 370/352
See application file for complete search history.

(56) References Cited

U.S. PATENT DOCUMENTS

| 2002/0110104 A1 | 8/2002 | Surdila | |
| 2003/0027595 A1* | 2/2003 | Ejzak | 455/560 |
| 2006/0105766 A1* | 5/2006 | Azada et al. | 455/432.1 |
| 2006/0154665 A1* | 7/2006 | Svensson et al. | 455/436 |
| 2008/0316998 A1* | 12/2008 | Procopio et al. | 370/352 |
| 2009/0023458 A1* | 1/2009 | Mountney | 455/456.1 |

\* cited by examiner

*Primary Examiner* — Kamran Afshar
*Assistant Examiner* — Khawar Iqbal
(74) *Attorney, Agent, or Firm* — Harness, Dickey & Pierce

(57) ABSTRACT

The invention concerns a device (D) dedicated to controlling access of a terminal (UE), connected to a CS domain of a mobile network comprising a MSC center (VMSC) running CS communications, to a IMS network services of which its user is a subscriber. Said device (D) comprises: i) a GMSC module managing setup of communications to a terminal (UE) connected to the CS domain, ii) a MGCF module converting messages from the CS domain in accordance with a ISUP protocol into messages in accordance with a SIP protocol addressed to a S-CSCF module and inversely, iii) an I-CSCF initiating registration of terminals connected to the CS domain, with a S-CSCF module, and iv) a P-CSCF emulator (P1) and a user agent (UA1) responsible a) for co-operating together on behalf of the terminal (UE) to instruct an I-CSCF module to initiate the registration of a terminal with a S-CSCF module of the IMS network of which its user is a subscriber, b) when the user attempts via the terminal (UE) to set up a call, for sending said call, via the MGCF module, to the S-CSCF module with which it is registered, and c) upon reception of a request for setting up communication to the terminal, from the S-CSCF module of the TMS network of which its user is a subscriber, for instructing the GMSC module, via the MGCF module, to manage said setting up on the CS domain side.

19 Claims, 4 Drawing Sheets

DEVICE FOR CONTROLLING ACCESS OF SUBSCRIBER TERMINALS OF A CS DOMAIN TO SERVICES OF AN IMS COMMUNICATION NETWORK

BACKGROUND

1) Field

The invention concerns mobile communication networks offering circuit-switched (CS) connectivity and Internet Protocol (IP) connectivity, and more precisely concerns controlling the access of subscriber terminals of the CS domain of a mobile communication network to services of an IMS (IP Multimedia (core network) Subsystem) communication network.

2) Related Art

As the person skilled in the art is aware, the operators of certain communication networks offering IP connectivity, for example the GPRS and UMTS networks, have developed IMS domains that offer specific services to customers who register with them (or subscribe to these services). For example, using the Session Initiation Protocol (SIP), it is possible to display on the screen of a communication terminal connected to an IMS domain a personal Internet page of the caller, or to make available enhanced voice communication services or IP multimedia services or instant messaging services, or to cause different terminals belonging to the same user to ring when he is called.

At the access network level, the IMS domain is based on a packet-switched (PS) access domain, for example a GPRS network, or a domain of a fixed communication network, for example an ADSL network, or a domain of a wireless local area network (WLAN).

In order to enable customers of CS domains to set up calls with customers of IMS domains, the core networks of the above networks include functional modules called media gateway control function (MGCF) modules and associated media gateways. The latter are responsible for converting signaling protocols used by the CS domains, for example ISUP or BICC, into IMS signaling protocols, for example SIP, and vice-versa. They therefore provide the interconnection between the IMS networks and the switched telephone networks, such as PSTN, ISDN, and the CS domains of mobile networks (PLMN).

Thanks to these MGCF modules (and the associated media gateways) a mobile telephone connected to a CS domain of a mobile network (PLMN) can set up a voice call with any mobile telephone connected to any IMS domain of any operator, for example. However, it cannot obtain the benefit of services offered by those IMS domains.

SUMMARY

Thus an object of the invention is to improve upon this situation, and in particular to make services offered by IMS networks available to selected customers of a CS domain and/or to optimize and/or "unify" certain service applications, for example a unified service (where applicable of IMS/CS prepayment), if possible without modifying the mobile service switching centers (MSC) and/or the IMS session control modules (call session control function (CSCF) modules) of the core networks of the IMS domains.

To this end it proposes a device for controlling access of a terminal, connected to a CS domain of a mobile communication network (said CS domain comprising at least one MSC responsible for managing the switching of CS calls), to services to which it subscribes and which are provided by an IMS communication network (comprising at least one P-CSCF (Proxy-Call Session Control Function) module and at least one S-CSCF (Serving-Call Session Control Function) module coupled to at least one application server (AS) offering the services.

This access control device is characterized in that it comprises, coupled to the MSC and to the IMS network:

- a GMSC (Gateway Mobile Switching Centre) module adapted to manage the setting up of a call to a terminal connected to the CS domain,
- an MGCF module responsible for converting messages coming from the CS domain in accordance with a CS signaling protocol (for example ISUP or BICC) into messages according to an IMS signaling protocol (for example SIP) intended for an S-CSCF module (belonging to the IMS network in which the subscriber who is using the terminal subscribes to IMS Services via a CS terminal), and conversely,
- an I-CSCF (Interrogating-Call Session Control Function) module responsible for initiating registration of subscribers requiring the IMS/CS service, connected to the CS domain, with an S-CSCF module (belonging to the IMS network in which the subscriber subscribes to IMS services), and
- a P-CSCF module emulator and a user agent responsible, firstly, for cooperating together in the name of the CS terminal to instruct the I-CSCF module to initiate the registration of the subscriber using the terminal with an S-CSCF module of the IMS network providing the services to which it subscribes, secondly, when the CS terminal attempts to set up a call, for sending, via the MGCF module, that call to the S-CSCF module with it is registered, and thirdly, in case of reception of a request to set up a call to the CS terminal, coming from the S-CSCF module (of the IMS network offering the services to which that terminal subscribes), to instruct the GMSC module, via the MGCF module, to manage that set-up on the CS domain side.

Hereinafter, "to subscribe to IMS services" systematically means to subscribe to one or more IMS services via a CS terminal.

The device of the invention can form an integral part of the MSC. However, if this is not the case, it can equally include an application server (AS) responsible, for each subscriber entitled to the service, for determining the address of an access control device of the mobile network to which that subscriber belongs, and then to supply the subscription information module of his own mobile network (for example of the home subscriber server (HSS) type) with an IMS marking via a CS terminal associated with the subscriber and associated complementary information, and (for example if the application server receives a message reporting that the CS terminal of a subscriber to the IMS services of his mobile network is registered with an MSC), to instruct the device so determined to proceed with registering that user with an S-CSCF module of the IMS network offering the services to which he subscribes. The complementary information associated with the IMS subscriber marking (via a CS terminal) consists of data for routing calls to the device so determined. It can be accompanied by data intended to determine as a function of which criterion or criteria to effect the routing via the device, for example.

Hereinafter, "IMS marking" systematically means a marking that designates a subscriber to one or more IMS services via a CS terminal.

The invention also proposes an MSC equipped with an access control device of the type described hereinabove.

The (integrated device) MSC of the invention can have other features and in particular, separately or in combination:

when a terminal of a subscriber user is connected to the MSC, the processor means can be responsible, if they receive (where applicable from a subscription information module (HSS-HLR) of the subscriber) an IMS marking indicating that the user of the terminal subscribes to IMS services, for storing in the VLR (Visitor Location Register) module, in corresponding relationship to information representing the subscriber, the IMS marking and the associated complementary information such as the address of the access control device of its IMS network;

the processor means can be responsible for instructing the access control device of their mobile network to proceed with the registration of the subscriber with the IMS network if the information includes an IMS marking and the terminal belongs to their mobile network;

the processor means can be responsible for instructing the access control device of a subscriber terminal, connected to a CS domain, to initiate the registration of the subscriber with the IMS network offering the services to which he subscribes if the information includes an IMS marking and the terminal does not belong to their mobile network;

in case of reception of a call set-up request coming from a subscriber terminal connected to the CS domain, the processor means can be responsible for determining if the subscriber is associated with an IMS marking indicating that he subscribes to the IMS services of an IMS network, and if so to send the request to the access control device to which they are coupled in order for it to process the request in cooperation with the IMS network offering the services to which it subscribes;

the processor means can be responsible for accessing the VLR module to determine if a calling subscriber connected to the CS domain subscribes to IMS services via a CS terminal;

in the presence of a terminal connected to the CS domain of its home mobile network, the IMS via a CS terminal marking is for example of the OSSS (Operator Specific Supplementary Service) type;

in the presence of a terminal connected to the CS domain but belonging to another mobile network, the IMS via a CS terminal marking is for example of the IN/CSI (Intelligent Network/CAMEL Subscription Information) type.

The invention also proposes an MSC coupled to an access control device including an application server of the type described hereinabove.

That MSC is characterized in that it comprises processor means coupled to an access control device and responsible, if they receive information indicating the connection of a terminal to the CS domain of their mobile network, for accessing a subscription information module (for example the HSS module) of their mobile network to send it the information with a view to updating it and so that the subscription information module can transfer to the subscriber's VLR module any IMS marking (indicating that the terminal user subscribes to services necessitating the use of the device) so that this marking is stored in corresponding relationship to information representing the subscriber.

This MSC can have other features and in particular, separately or in combination:

if they receive a call set-up request coming from a terminal connected to the CS domain, their processor means can be responsible for determining if the subscriber using the terminal is associated with an IMS marking indicating that he subscribes to the IMS services, and if so, if the marking is associated with OSSS (Operator Specific Supplementary Service) data, for routing the call set-up request to the access control device as a function of further OSSS information, or, if that marking is associated with IN/CSI (Intelligent Network/CAMEL Subscription Information) data, for requesting from a service control point (SCP) information for routing the requested call to the access control device of the mobile network to which the requesting terminal subscribes, and then for routing the call set-up request to that access control device as a function of the routing information;

the processor means can be responsible for accessing the VLR module to determine if a caller whose terminal is connected to the CS domain subscribes to IMS services.

BRIEF DESCRIPTION OF THE DRAWINGS

Other features and advantages of the invention will become apparent on reading the following detailed description and examining the appended drawings, in which.

DETAILED DESCRIPTION

The appended drawings can constitute part of the description of the invention as well as contributing to the definition of the invention, if necessary.

An object of the invention is to make available to selected (called or calling) customer terminals of a circuit-switched (CS) domain services offered by IMS networks to which they are subscribers and/or to optimize certain IMS/CS service applications.

Figure 1:
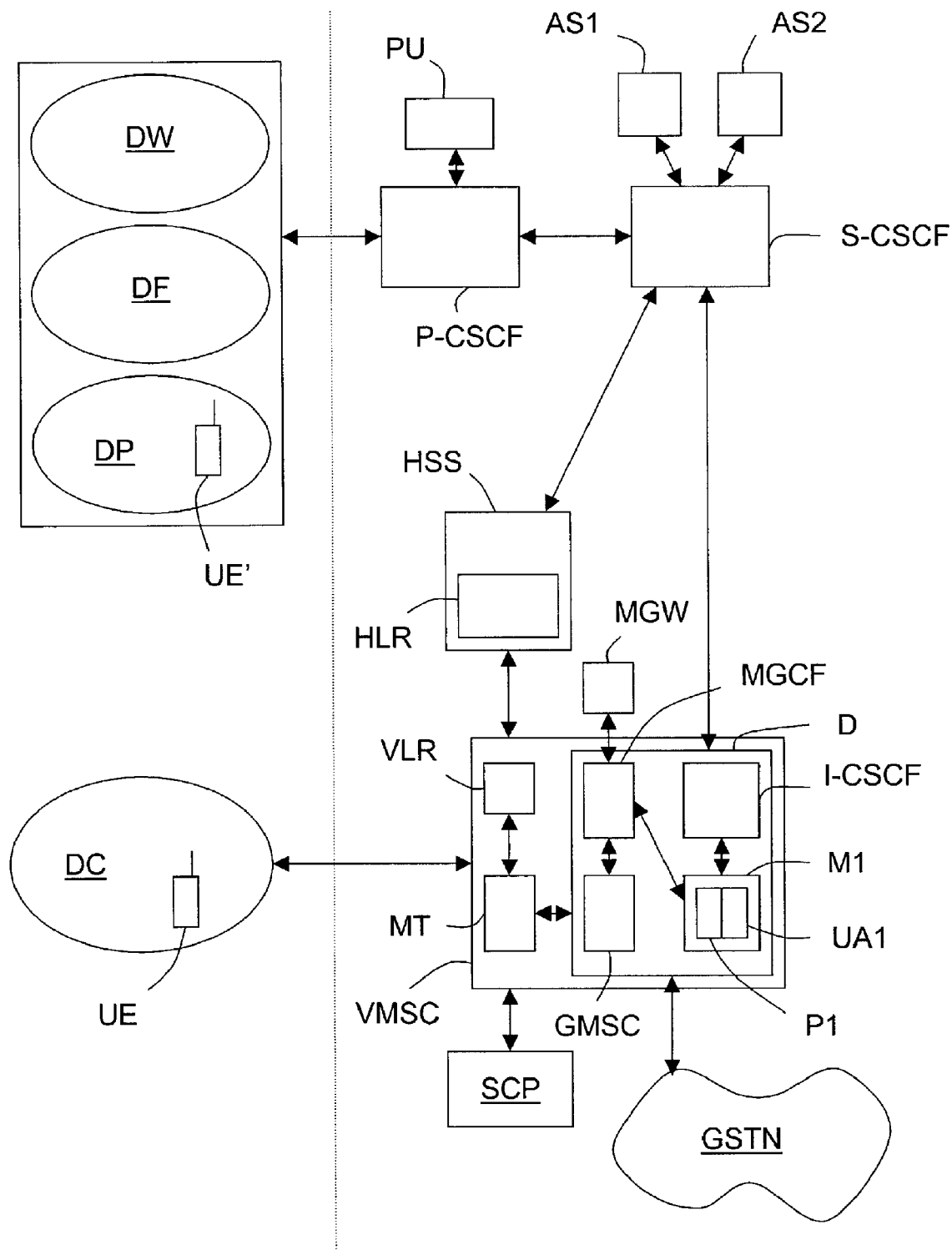
FIG. 1 shows diagrammatically and functionally a portion of a mobile network connected to an IMS network and including a first embodiment of an access control device of the invention.

As shown in FIG. 1, some mobile communication network operators have not only a mobile network, for example a GPRS/EDGE or UMTS network, offering Internet Protocol (IP) connectivity, but also an IMS network connected to their mobile network via the packet-switched (PS) domain of the latter. The core network then consists of a CS (circuit-switched) sub-portion and an IMS sub-portion.

The components of a mobile network and an IMS network being familiar to the person skilled in the art, they will not be described in detail here, as they are in particular in the 3GPP specification RFC 23.002 (for the IMS network), available on the 3GPP Internet site. The same mechanisms apply equally to networks based on the CDMA 2000 access technology and the Core MMD technology (equivalent to IMS) defined by 3GGP2.

There are merely outlined hereinafter a few functions of core network modules or elements useful for an understanding of the invention.

An IMS network enables subscriber customers to obtain specific IMS services when they are connected to a packet domain DP of their network or a visited network in the case of roaming. To this end, the IMS core network includes an IMS session control module or P-CSCF (Proxy-Call Session Control Function) module that is the first point of contact with the IMS core network for a terminal UE of a subscriber customer connected to an IMS domain.

Remember that an IMS domain can be connected to a packet-switched (PS) domain, for example a GPRS network, or to a fixed communication network DF, for example an ADSL network, or to a domain of a WLAN (Wireless Local Area Network) DW.

This P-CSCF module has a CSCF function for routing SIP (Session Initiation Protocol) messages. Its functions generally include, in particular, a security function, a user plane (PU) control function, an SIP compression function, a charging identifier generation function, a subscriber identity assertion function, a subscriber public address/IP address correspondence function, and a function for managing routing to and from another session control module called the S-CSCF (Serving-Call Session Control Function) module.

The S-CSCF module constitutes the port of entry to the IMS services offered by the IMS network. To this end, it is connected to one or more application servers (AS) AS1 and AS2. It is responsible in particular for authentication of subscribers and for storing the address of the P-CSCF module to which the terminal of an IMS subscriber is connected.

This S-CSCF module is coupled to a subscription database called the HSS (Home Subscriber Server) in order to recover information on subscribers and to store therein the known addresses of said subscribers.

As will emerge hereinafter, the S-CSCF module cooperates with the HSS module and another session control module called the I-CSCF (Interrogating-Call Session Control Function) module during phases of registering the terminals of the subscribers on the IMS domain.

In a conventional environment, the I-CSCF module is in particular responsible for locating the subscribers to the IMS services of its IMS network. To this end, it is connected not only to the HSS module of its IMS network, but also to the core networks of the other IMS networks, and more precisely to their S-CSCF modules.

The core network of a CS domain mobile network includes in particular a call management centre called the mobile service switching center (MSC) which is responsible for managing the switching of circuit-switched (CS) calls (or call requests). This MSC processes in particular the cell change (handover) procedures. It is connected to a subscription database called the HLR (Home Location Register), which is generally part of the HSS module, in order to recover information on subscribers and to store therein the known positions and addresses of said subscribers. Moreover, it includes a memory (or database) called the VLR (Visitor Location Register) in which it stores data relating to each subscriber whose terminal UE is connected to the CS domain (DP in FIG. 1), which it manages and which it has extracted from the HLR module.

The MSC module is also connected to a service control point (SCP) which stores information/algorithms intended to enable the provision of specific services to CS subscribers, which services can necessitate rerouting of the calls (or call requests) of the terminals connected to the CS domain that it manages.

In a conventional environment, the connection between an S-CSCF module of an IMS network and each (CS domain) mobile network, in particular, is effected by way of a module called the MGCF (Media Gateway Control Function) module, which is responsible for converting the signaling protocol used by the CS domain, for example ISUP or BICC, into an IMS signaling protocol used by the IMS network, for example SIP, and vice-versa. It also handles the interconnection between an IMS network and switched telephone networks, such as PSTN and ISDN.

The MGCF module also controls an MGW (Media Gateway) responsible in particular for interworking between the IMS domain and the CS domain at the user plane level, for example for translating voice in packet mode into voice in circuit (TDM) mode.

Moreover, in a conventional environment, the core network of a CS domain mobile network includes a routing interface called the GMSC (Gateway Mobile Switching Center), connected to the MSC module, to the HLR module and to the other switched telephone networks lumped together under the name GSTN (Generalized Switch Telephony Networks), for example PSTN and ISDN.

This GMSC module is responsible in particular for interrogating the HLR module in order to locate the mobile terminal UE of a subscriber.

It receives the incoming call requests originating from a GSTN network. Outgoing (non-IMS) calls from a CS domain are transmitted directly to the GSTN network concerned by the MSC.

To enable a terminal connected to a CS domain of a mobile network to use at least some of the services that are offered by an IMS network to which it subscribes, the invention proposes an access control device D coupled to the MSC of the mobile network and to the S-CSCF module of the associated IMS network.

This access control device D is responsible for serving both as the user agent for a terminal UE connected to a CS domain and subscribing to IMS services and as a P-CSCF proxy module vis-à-vis the S-CSCF module of the IMS network to which said terminal UE subscribes.

To this end, and as shown in FIG. 1, the access control device D includes a GMSC module, an MGCF module, an I-CSCF module, and an intermediary module M1 comprising a P-CSCF module emulator P1 and a user agent UA1.

The GMSC, MGCF and I-CSCF modules are identical functionally to the conventional modules described hereinabove. Consequently:
- the GMSC module is responsible for managing the setting up of calls to UE terminals connected to the CS domain of the mobile network,
- the MGCF module is responsible for converting a message coming from a terminal UE connected to the CS domain of the mobile network conforming to a CS signaling protocol (for example ISUP) into a message conforming to an IMS signaling protocol (for example SIP), to be sent to the S-CSCF module that belongs to the IMS network through which the terminal UE subscribes to IMS services, and vice-versa, and
- the I-CSCF module is responsible for initiating the registration of a terminal UE that is connected to the CS domain with the S-CSCF module that belongs to the IMS network via which it subscribes to the IMS services.

The P-CSCF module emulator P1 provides only a portion of the functions of a conventional P-CSCF module, and in particular the charging identifier generation function, the subscriber identity assertion function, and the function for managing routing to and from the S-CSCF module that belongs to the IMS network via which the terminal UE concerned subscribes to IMS services.

The user agent UA1 is substantially identical to the user agents installed in the terminals connected to the IMS domain, and in particular to those connected to the packet-switched (PS) domain DP.

This P-CSCF module emulator P1 and the associated user agent UA1 cooperate in order:

in the name of a terminal UE that is connected to a CS domain, to instruct the I-CSCF module of their device D to initiate the registration of said terminal UE with an S-CSCF module of the IMS network through which the subscriber using this terminal subscribes to IMS services, to instruct the GMSC module of their device D, via the associated MGCF module, to manage the setting up of a call to a terminal UE connected to a CS domain when they receive a call set-up request coming from the S-CSCF module (of the IMS network) with which the terminal UE is registered, in the name of a terminal UE that is connected to a CS domain, when solicited by the MGCF module, if the terminal UE calls, to transmit the call to the S-CSCF module (of the IMS network) with which the terminal UE is registered.

The device D of the invention can form an integral part of the MSC, as shown in FIG. 1. This embodiment is particularly suitable for operators who deploy CS domain mobile networks including new MSC, for example comprising NGN (New Generation Network) servers adapted to the SIP signaling protocol.

In this case, the device comprises a processor module MT coupled to the module VLR and to the access control device D.

This processor module MT is responsible for intervening, on the one hand, during the phase of registering a terminal UE connected to the CS domain with the IMS network to which it subscribes and, on the other hand, during the setting up of a call with a terminal UE connected to the CS domain.

Figure 2:
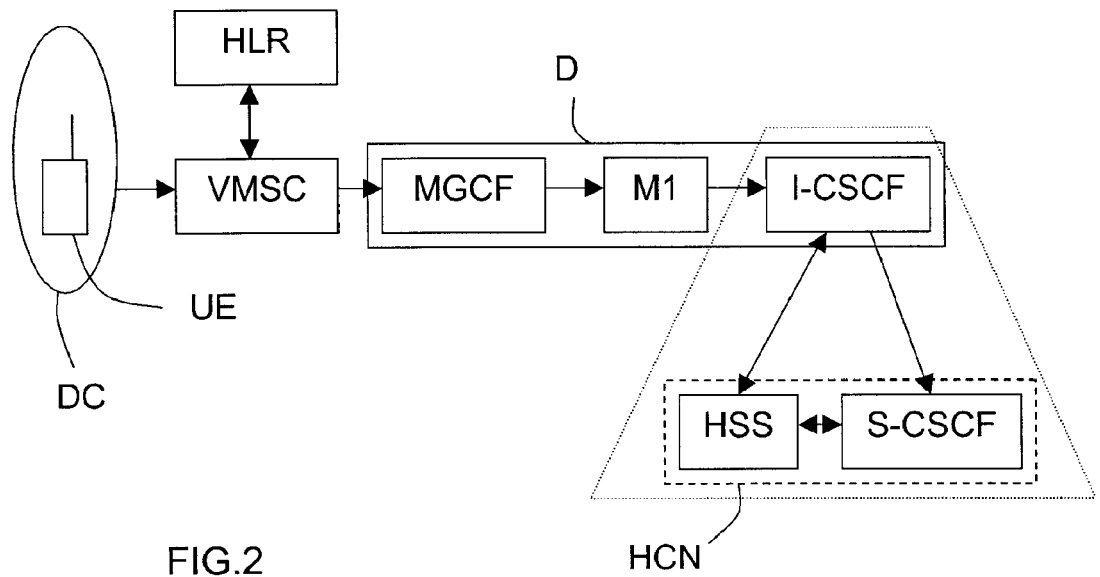
FIG. 2 shows diagrammatically and functionally the main network modules or elements involved in a terminal IMS registration phase when the access control device is integrated into the MSC.

The operation of the device D and the processor module MT during a registration phase is described next with reference to FIG. 2.

The MSC is informed when a terminal UE is connected to the CS domain of a mobile network or a terminal UE changes position within the CS domain of a mobile network.

It is important to note that the terminal UE can be either connected to the CS domain of its home mobile network or to the CS domain of a mobile network that it is visiting (roaming). Hereinafter the term VMSC (Visited MSC) refers to an MSC to which a mobile terminal is connected, whether that MSC belongs to a home mobile network or a visited mobile network. As will emerge hereinafter, what it is important to distinguish is, on the one hand, an IMS core network connected to a CS visited mobile network to which a terminal UE does not subscribe and, on the other hand, an IMS core network connected to a visited CS mobile network to which a terminal UE subscribes. Consequently, the expression "HCN home IMS core network" refers hereinafter to an IMS network corresponding to the home mobile network of a terminal UE. A mobile network can be a visited network and a home network at one and the same time.

Once a VMSC has processed the attachment of a terminal UE, its processor module MT accesses the HLR module of the home network of the subscriber using the terminal in order to update the information that it stores and to recover, in particular, any subscription information (IMS marking) indicating that said subscriber has subscribed to access to IMS services via a CS terminal.

Its processor module MT then stores in the VLR module of its VMSC, in corresponding relationship to information representing a subscriber, the IMS marking associated with that subscriber, received from the HLR module, and associated complementary data such as the address of the access control device D of the home IMS network of the subscriber (HCN).

Three situations can then arise: the subscriber using the terminal UE is not associated with an IMS marking, the subscriber using the terminal UE is associated with an IMS marking and the visited CS mobile network is the home mobile network of the terminal UE, or the subscriber using the terminal UE is associated with an IMS marking and the visited CS mobile network is not the home mobile network of the terminal UE.

In the first situation, there is no IMS registration to be effected, and the registration phase therefore ends.

In the second situation, the processor module MT instructs the access control device D of its VMSC to proceed with the IMS registration of the subscriber using the terminal UE with the home IMS network HCN. The processor module MT then sends the intermediary module M1 (consisting of P1 and UA1) a registration request and the information for accessing the home IMS core network HCN, and more precisely an S-CSCF module, via the I-CSCF module.

The module M1 then generates a registration request (REGISTER) in the name of the terminal UE concerned which it then sends to the I-CSCF module of its device D, which is responsible for initiating the IMS registration of the terminal UE concerned with an S-CSCF module (of the core network HCN) that the I-CSCF module has chosen. This IMS registration is effected in accordance with the standard procedure triggered by the request REGISTER, as if the intermediary module M1 were a standard P-CSCF module. It therefore involves, in the conventional way, not only the I-CSCF module of the device D, installed in the VMSC, and an S-CSCF module of the local HCN, but also the HSS module of the local HCN.

In the third situation (the subscriber using the terminal UE is associated with an IMS marking and the visited CS mobile network is not the home mobile network of the terminal UE), an Application Server module in the home network, on receiving a message indicating that the CS terminal of a subscriber to the IMS services of his home mobile network is registered with an MSC, instructs the external device D that it has selected to proceed with the registration of the terminal with an S-CSCF module of the IMS network. The intermediary module M1 of the external device D then generates a registration request REGISTER in the name of the terminal UE concerned and then sends it to the I-CSCF module of the same device D, which must then be connected to the distant home IMS network to initiate the IMS registration of the terminal UE concerned with an S-CSCF module. This IMS registration is also effected in accordance with the standard procedure triggered by the request REGISTER, as if the intermediary module M1 were a standard P-CSCF module. It therefore involves, in the conventional way, not only the I-CSCF module of the device D but also an S-CSCF module and the HSS module of the distant HCN.

If the terminal UE is connected to the CS domain of its home mobile network and subscribes to services of the associated IMS network, its IMS marking is for example a PLMN operator specific supplementary service (OSSS) mark. This OSSS mark is also used to reroute a call forcibly to a node that is the local access control device D (see below).

If the terminal UE is connected to the CS domain of a visited mobile network different from its home network and subscribes to services of the IMS network of that home mobile network, its IMS marking is of the IM/CSI (Intelligent Network/CAMEL Subscription Information) type, for example. This IN/CSI marking is used to reroute a call forcibly to a distant node that is the distant access control device D installed in the distant home mobile network (see below).

The type of IMS marking (internal—OSSS—or IN/CSI) sent by the HLR module to the VMSC is chosen by the HLR (for example as a function of whether the visited CS mobile network is or is not the home mobile network of the terminal).

Figure 3:
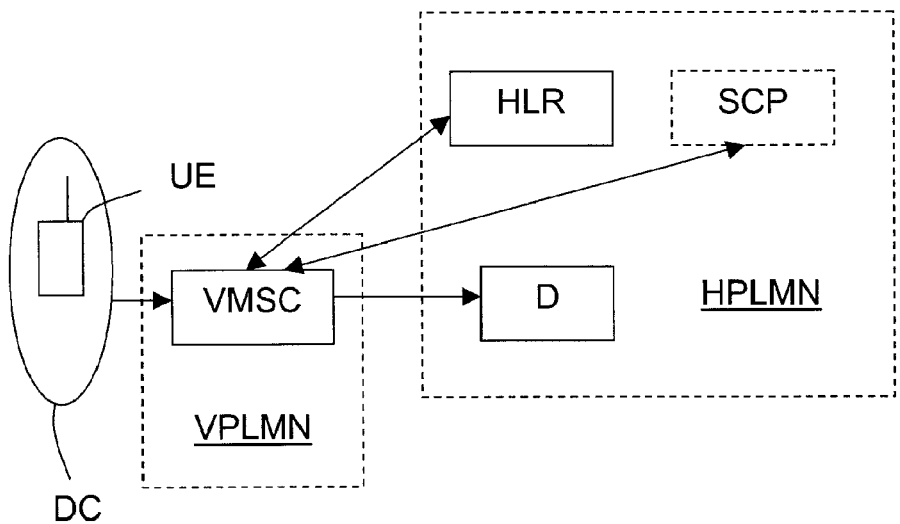
FIG. 3 shows diagrammatically and functionally the main network modules or elements involved in a call set-up phase at the initiative of a terminal connected to a CS domain.

The operation of the device D and the processor module MT during a phase of call set-up at the initiative of a terminal UE connected to a CS domain is described next with reference to FIG. 3.

If a terminal UE, connected to the CS domain of a mobile network, wishes to set up a call, it informs the VMSC that manages that CS domain.

The VMSC alerts its processor module MT in order for it to determine if the terminal UE concerned is associated with an IMS marking indicating that it subscribes to IMS services via a circuit-switched (CS) terminal. To this end, the processor module MT accesses the VLR module that is installed in its VMSC in order to analyze the data stored therein in corresponding relationship to the identifier of the terminal UE.

As in the case of registration, three different situations can then arise: the terminal UE is not associated with an IMS marking, the terminal UE is associated with an IMS marking and the visited mobile network is the home mobile network of the terminal UE, or the terminal UE is associated with an IMS marking and the visited mobile network is not the home mobile network of the terminal UE.

In the first situation, the terminal UE cannot benefit from the IMS services of an IMS network. Consequently, the VMSC routes the call from the terminal UE to one of the GSTN networks.

In the second situation, the processor module MT instructs the access control device D of its VMSC to route the call to the local IMS network, and more precisely to its IMS core network, which here is the IMS home core network HCN. The processor module MT then sends the call set-up request via the MGCF module (in order for it to convert this request according to the ISUP protocol into a request according to the SIP protocol) to the intermediary module M1 (consisting of P1 and UA1).

Figure 4:
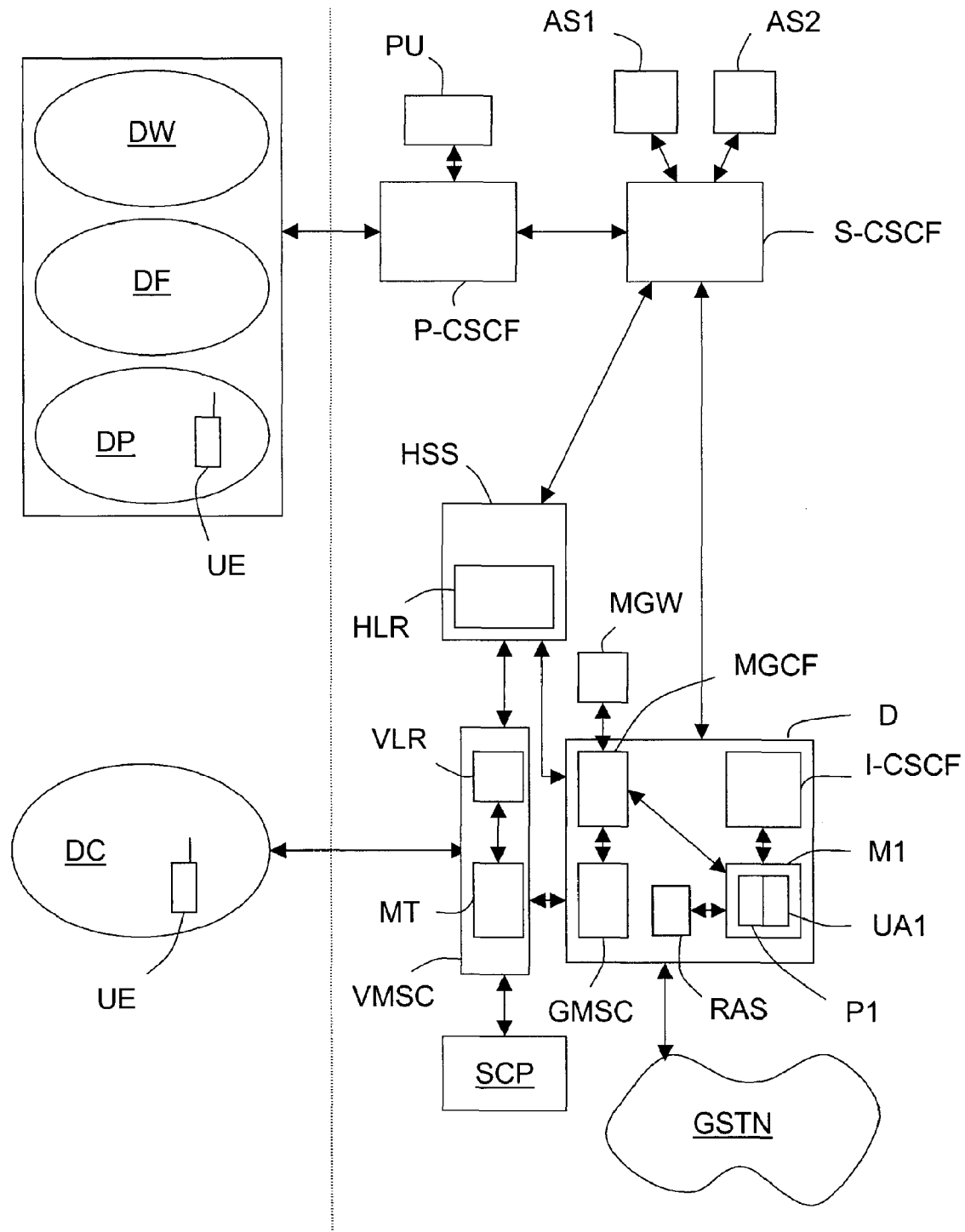
FIG. 4 shows diagrammatically and functionally a portion of a mobile network connected to an IMS network and including a second embodiment of an access control device of the invention.

The module M1 then routes this call set-up request to the S-CSCF module (of the core network HCN) with which the requesting terminal UE is registered. The S-CSCF module is then responsible for processing the set-up request like a normal IMS call, including the call to application servers (AS), for example AS1 and AS2 as shown in FIGS. 1 and 4, that provide the IMS services to which the subscriber subscribes.

In the third situation, the processor module MT, in conformance with the IMS marking of the subscriber data stored in the VLR module, requests from a service control point (SCP) instructions for routing the call. Then, when it receives the response from the SCP, it routes the call set-up request to the access control device D of the mobile network of which the requesting terminal is a subscriber. The MGCF module of this device D converts this request conforming to the ISUP protocol into a request conforming to the SIP protocol and transmits it to the intermediary module M1 (consisting of P1 and UA1).

The module M1 then routes this call set-up request to the distant S-CSCF module (of the distant core network HCN) with which the requesting subscriber is registered. The S-CSCF module is then responsible for processing the set-up request like a normal IMS call, including the call to application servers (AS), for example the servers AS1 and AS2 in FIGS. 1 and 4, which provide the IMS services to which the subscriber subscribes.

There has been described hereinabove the case of an access control device D integrated into an MSC. However, as shown in FIG. 4, the access control device D can equally not form part of the MSC of its mobile network, although it is connected thereto and to the S-CSCF module of the associated IMS network.

In this case, it is advantageous for the access control device D also to include an application server (AS) RAS.

That application server RAS is mainly dedicated to the phase of IMS registration of the terminals UE that are connected to the CS domain of its mobile network.

Figure 5:
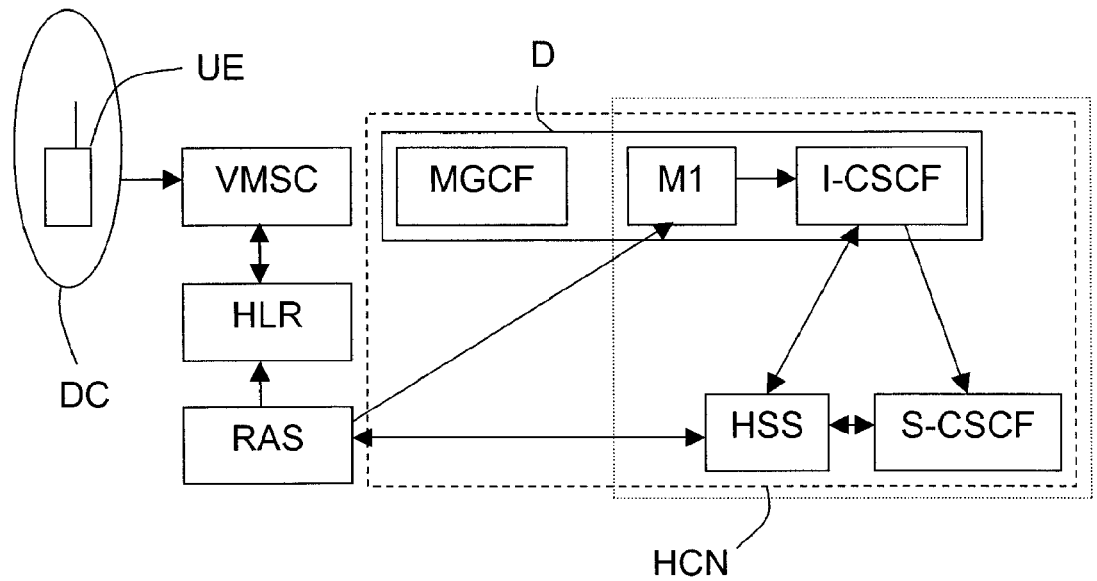
FIG. 5 shows diagrammatically and functionally the main network modules or elements involved in a terminal IMS registration phase when the access control device is not integrated into the MSC.

The operation of the device D (when it is not integrated into the MSC) and the processor module MT of that center MSC during a registration phase involving an application server RAS is described next with reference to FIG. 5.

The application server RAS is responsible for determining, for a subscriber who subscribes to the IMS access via a CS terminal service and whose terminal is connected to the CS domain, the address of the access control device D within that mobile network. Of course, the application server RAS can form part of an access control device D that is installed in the mobile network to which the terminal belongs.

The application server RAS then supplies the module HLR of its own (local) mobile network an IMS marking associated with the terminal and complementary information such as, for example, information intended to enable routing of the call to the access control device D that it has determined (and that can be distant and therefore different from that in which it is installed).

Finally, it instructs the access control device D that it has determined to proceed with the registration of the subscriber with an S-CSCF module of the IMS network that offers the services to which it subscribes and that is connected to its home mobile network.

More precisely, the application server RAS instructs the intermediary module M1 (consisting of P1 and UA1) of the access control device D that it has determined to register the subscriber concerned with an S-CSCF module of the IMS core network HCN to which it is locally connected.

The module M1 then generates a registration request REGISTER in the name of the terminal concerned which it then sends to the I-CSCF module of its access control device D, which is responsible for initiating the IMS registration of the terminal concerned with an S-CSCF module of the IMS core network HCN. This IMS registration is effected in accordance with the standard procedure initiated by the request REGISTER, as if the module M1 were a standard P-CSCF module. It therefore, in the conventional way, involves not only the I-CSCF module of the device D (as determined by the application server RAS), but also an S-CSCF module and the HSS module HCN.

If the terminal UE is connected to the CS domain of its home mobile network and the user of the terminal subscribes to services of the IMS network via a terminal CS, his IMS marking is, for example, a PLMN specific supplementary service mark of the OSSS (Operator Specific Supplementary Service) type.

If the terminal UE is connected to the CS domain of a visited mobile network that is different from its home network and the user of the terminal is a subscriber to services of the IMS network (via a CS terminal) of that home mobile network, its IMS marking is of the IN/CSI (Intelligent Network/CAMEL Subscription Information) type, for example.

Refer again to FIG. 3 for a description of the operation of the processor module MT of a VMSC and of the device D (separate from said VMSC) during a call set-up phase at the initiative of a terminal UE connected to a CS domain.

If a terminal UE connected to the CS domain of a mobile network wishes to set up a call, it informs the VMSC that manages the CS domain.

The VMSC alerts its processor module MT in order for it to determine if the user of the terminal UE concerned is associated with an IMS marking indicating that he is a subscriber to the IMS services of an IMS network. To this end, the processor module MT accesses the VLR module that is installed in its VMSC in order to analyze the data that is stored in corresponding relationship to the coordinates of the user of the terminal UE, and in particular to determine if an IMS marking is stored in corresponding relationship to the coordinates of this user.

Two different situations can then arise: either the user is not associated with an IMS marking, or the user is associated with an IMS marking.

In the first situation, the terminal UE cannot benefit from the IMS services of an IMS network. Consequently, the VSMC routes the call from the terminal UE to one of the GSTN networks, for example the visited mobile network VPLMN.

In the second situation, the processor module MT accesses the service control point (SCP) in which are stored the information and the algorithms for routing calls (or call requests) of subscribers who subscribe to services requiring the implementation of that SCP.

The processor module MT then routes the call set-up request to the access control device D whose address has been communicated by the service control point SCP. As indicated hereinabove, this access control device D can be either that to which its VMSC is locally connected or an access control device D belonging to the distant mobile network to which the user of the requesting terminal UE is a subscriber. Routing can be effected by adding a prefix to the "called party" field, for example.

In either case, the access control device D to which the call request is routed transmits the call set-up request to its MGCF module in order for it to convert that request according to the ISUP protocol into a request according to the SIP protocol. The MGCF module then sends the converted request to the intermediary module M1 (consisting of P1 and UA1) of its access control device D, which transmits it to the S-CSCF module of the IMS home core network HCN, with which the requesting subscriber is registered. The S-CSCF module is thereafter responsible for processing the set-up request like a normal IMS call, including the call to application servers (AS), for example the servers AS1 and AS2 in FIGS. 1 and 4, which provide the IMS services to which the subscriber subscribes.

Figure 6:
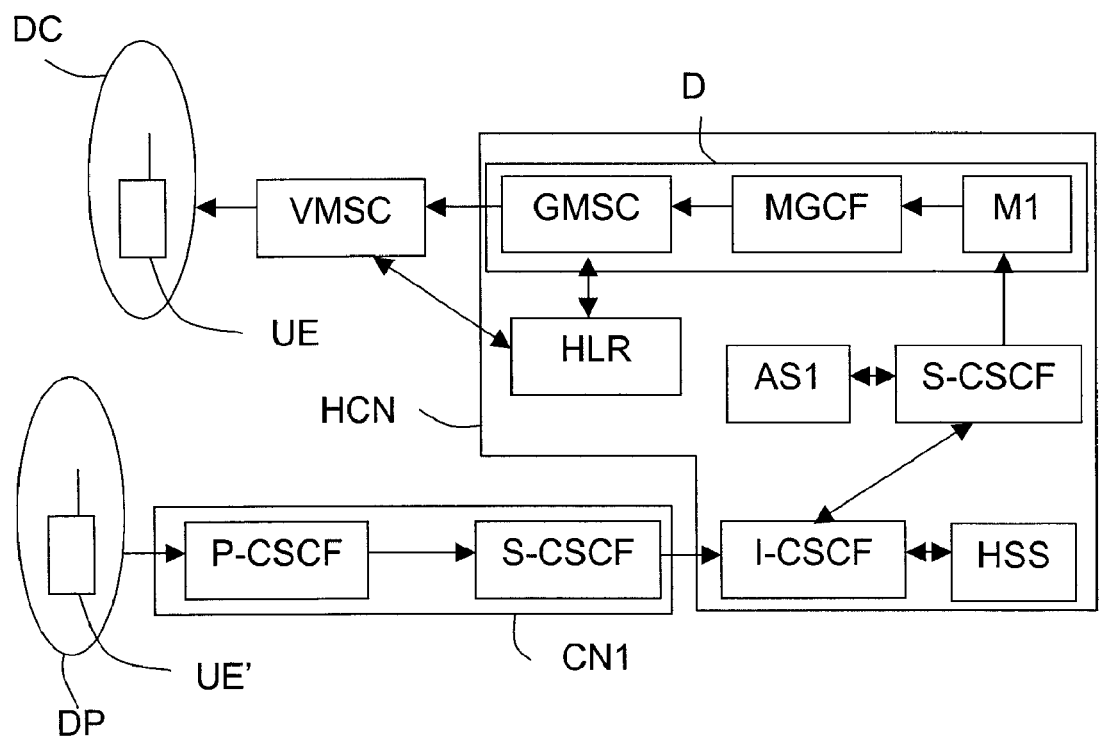
FIG. 6 shows diagrammatically and functionally the main network modules or elements involved in a call set-up phase to a terminal connected to a CS domain.

The operation of the device D and the processor module MT during a phase of setting up a call to a terminal UE connected to a CS domain is described next with reference to FIG. 6.

If a terminal UE' connected to an IMS domain wishes to set up a call with a terminal UE connected to a CS domain of a mobile network, it transmits the call set-up request to the P-CSCF module to which it is connected, which transmits it to the S-CSCF module of its IMS core network CN1. The S-CSCF module of the IMS network CN1 then transmits it to an I-CSCF module of the HCN to which the user of the called terminal UE is a subscriber. This I-CSCF module then determines, thanks to the HSS module, the information relating to the address of the S-CSCF module with which the called subscriber is registered. Remember that this information is deemed to have been stored during an earlier registration phase.

The I-CSCF module then transmits the call set-up request to the S-CSCF module with which the called subscriber is registered. That S-CSCF module, after calling the application server(s) (for example AS1) supporting the services to be provided to the called party, then transmits that call set-up request to the access control device D (which, as seen from the S-CSCF module, performs exactly the same role as a P-CSCF module).

This call set-up request is then received by the intermediary module M1 of the access control device D which transmits it to the MGCF module of said device D in order for it to convert it from the SIP protocol to the ISUP protocol, understandable by the GMSC module of the same device D, which is responsible for managing the setting up of calls to the terminals that are connected to the CS domain that it manages.

Once it is in possession of the call set-up request, the GMSC module accesses the HLR module of the mobile network to which the subscriber using the call terminal UE subscribes. It then contacts the VMSC which manages call switching for the CS domain to which the called terminal UE is connected in order for the call to be set up.

The access control device D of the invention, and in particular its MGCF module, its GMSC module, its intermediary module M1, its I-CSCF module and its application server RAS, if any, and/or the processor module MT of the call switching centre (V)MSC, can be produced in the form of electronic circuits, software (or electronic data processing) modules, or a combination of circuits and software.

The invention is not limited to the access control device and mobile service switching centre embodiments described hereinabove by way of example only, but encompasses all variants that the person skilled in the art might envisage within the scope of the following claims.

Thus there is described hereinabove an embodiment of the invention in which access by a subscriber to IMS services, whose terminal is connected to a circuit-switched (CS) domain, is systematic. However, this is not obligatory. In fact it can be envisaged that the IMS marking (or complementary data) specifies conditions (or criteria) enabling the provision of the IMS services to a subscriber.

For example, this possibility of providing IMS services to subscribers may be offered by only some operators. This possibility of providing IMS services can equally be offered to only some subscribers (who subscribe to this type of service).

Moreover, for a subscriber who subscribes to this type of service, the possibility of sending a call sent by its terminal CS to the IMS services cannot be systematically implemented if that call is sent by said CS terminal. The IMS via CS terminal markings (OSSS or IN/CSI) can, for example, contain one or more criteria for deciding when a call can be rerouted or not to the IMS network.

Moreover, the intermediary module (referenced M1 hereinabove) can be configured with data for choosing the information that is placed in the IMS registration message (for example of REGISTER type), and thus controlling when and/or with what priority a received IMS call must be sent to a CS terminal of a called subscriber.

The mechanisms described hereinabove can also enable the subscribers of an operator who provides the IMS/CS service facility but who are roaming in the network of another (visited) operator to obtain the benefit of this possibility, independently of how that possibility is supported by the visited operator.

The invention claimed is:

1. A Device for controlling access of a terminal, connected to a Circuit Switched (CS) domain of a mobile communication network comprising at least one Mobile Switching Center (MSC), the device to control subscribed services of an IP Multimedia Subsystem (IMS) communication network including a Serving Call Session Control Function (S-CSCF) module, said device coupled to said MSC and to said IMS network, comprising:

a Gateway Mobile Switching Center (GMSC) module configured to manage setting up of a call to the terminal;

a Media Gateway Controller Function (MGCF) module configured to convert messages from the CS domain into messages according to an IP Multimedia Subsystem (IMS) signaling protocol intended for the S-CSCF module;

an Interrogating Call Session Control Function (I-CSCF) module configured to initiate subscriber registration with the S-CSCF module, and a Proxy Call Session Control Function (P-CSCF) module emulator and a user agent (UA1) configured to cooperate with the terminal to instruct said I-CSCF module to initiate the subscriber registration with the S-CSCF module, the P-CSCF module being further configured to send a call request via said MGCF module to the S-CSCF module if the subscriber attempts to set-up a call via the terminal, and to instruct said GMSC module, via said MGCF module, to manage the call set-up on the CS domain side if the terminal receives a request to set-up the call from the S-CSCF module.

2. The device according to claim 1, wherein said P-CSCF module emulator and said UA1 are configured to cooperate with the terminal at the request of said MSC.

3. The device according to claim 1, further including:

an application server (RAS) configured to, if the RAS receives a message indicating that the subscriber must use IMS service(s) via a CS terminal, to determine the address of a processor of the home mobile network of the subscriber, and then to supply to an associated home mobile network of the subscriber a subscription information module (HSS) of an IMS marking associated with said subscriber and information intended to enable call routing to said processor of the home mobile network, and to instruct the processor of the home mobile network to proceed to the registration, or to the termination of the registration, of said subscriber with an S-CSCF module of the IMS network offering the subscribed services.

4. The device according to claim 3, wherein said P-CSCF module emulator and said UA1 are configured to cooperate with said terminal at the request of the RAS.

5. The device according to claim 3, wherein the RAS is configured to instruct said device to proceed to the registration or to the termination of the registration of said subscriber with an S-CSCF module of the IMS network offering the subscribed services, as a function of a chosen condition.

6. The device according to claim 5, wherein said chosen condition is the registration or the termination of the registration of the subscriber with an MSC of the CS domain of a network other than the home network of the device.

7. The MSC (VMSC) configured to manage CS calls in the mobile communication network including at least one CS domain and connected to the IMS communication network comprising the P-CSCF module and the S-CSCF module coupled to at least one application server (AS1) offering IMS services, wherein the MSC includes the device according to claim 1.

8. The MSC according to claim 7, including a processor configured to, if the MSC receives information indicating the connection of the terminal, access the HSS of the associated mobile network in order to send the HSS said information for the processor to update itself and then transfer into a home Visitor Location Registry (VLR) module of said subscriber any IMS markings indicating that the terminal subscribes to IMS services via a CS terminal, in order for said IMS via the CS terminal marking and said complementary information to be stored in corresponding relationship to information representing said subscriber.

9. The MSC according to claim 8, wherein the processor is configured to instruct said device of the associated mobile network to proceed to the registration of the subscriber with the IMS network if said information includes an IMS marking and the subscriber belongs to their mobile network.

10. MSC according to claim 8, wherein the processor is configured to instruct said the device of the associated mobile network to initiate the registration of said subscriber with the IMS network offering the services to which he subscribes if said information includes an IMS marking and said subscriber does not belong to their mobile network.

11. The MSC according to claim 7, wherein if the reception of the request to set-up the call coming from the terminal connected to said CS domain, said processor is configured to determine if the terminal is associated with an IMS marking indicating that the terminal subscribes to the IMS services of an IMS network, and if so to send said request to said device to which the device and the MSC are coupled in order for it to process said request in cooperation with said IMS network offering the subscribed services.

12. The MSC according to claim 11, wherein the processor is configured to access said VLR module to determine if a caller whose terminal is connected to said CS domain subscribes to IMS services.

13. The MSC according to claim 7, wherein if the terminal is connected to the CS domain of the associated its-home mobile network, each IMS marking is of OSSS type.

14. The MSC according to claim 7, wherein if the terminal is connected to said CS domain but belongs to another mobile network, each IMS marking is of the IN/CSI type.

15. A MSC (VMSC) configured to manage CS calls in a mobile communication network including a CS domain and connected to an IMS communication network, comprising at least one P-CSCF module and at least one S-CSCF module coupled to at least one application server (AS1) offering IMS services, and the device according to claim 1, wherein the MSC comprises a processor configured to in case of reception of information indicating a connection of the terminal to said CS domain of an associated mobile network, to access a subscription information module (HS S) of the associated mobile network to send the associate mobile network said information with a view to updating the information and requesting from the associated mobile network information on the subscriber using said terminal, and the information on the subscriber being any IMS marking indicating that the subscribers subscribes to IMS services of an IMS communication network, and for storing in a Visitor Location Registry (VLR) module of the associated mobile network the IMS marking associated with said subscriber and complementary information representing an address of the device of the IMS network to which the terminal belongs, sent by said HSS, in corresponding relationship to information representing said subscriber.

16. The MSC according to claim 15, wherein if the reception of the call set-up request coming from the terminal connected to said CS domain, said processor is configured to determine if the terminal is associated with an IMS marking indicating that the subscriber subscribes to the IMS services, and if so to request from a service control point (SCP) information intended to enable routing of the requested call, and then to route said call set-up request to the device as a function of said routing information.

17. The MSC according to claim 16, wherein the processor is configured to access said VLR module to determine if the terminal connected to said CS domain corresponds to the subscriber to IMS services via a CS terminal.

18. The MSC according to claim 15, wherein the presence of the terminal connected to the CS domain of the associated mobile network, each IMS marking is of the OSSS type.

19. The MSC according to claim 15, wherein the presence of the terminal connected to said CS domain but belonging to another mobile network, each IMS marking is of the IN/CSI type.

* * * * *